(Model.) 2 Sheets—Sheet 1.

G. ST. MEYER.
LOCK.

No. 420,285. Patented Jan. 28, 1890.

WITNESSES:
Fred G. Dieterich
Jos. A. Ryan

INVENTOR
Georg St Meyer
BY Munn & Co
ATTORNEY (Model.)

2 Sheets—Sheet 2.

G. ST. MEYER.
LOCK.

No. 420,285. Patented Jan. 28, 1890.

WITNESSES:
Fred G. Dieterich
Jos. A. Ryan

INVENTOR
Georg St. Meyer
BY Munn & Co.
ATTORNEY

UNITED STATES PATENT OFFICE.

GEORG ST. MEYER, OF FELTON, PENNSYLVANIA.

LOCK.

SPECIFICATION forming part of Letters Patent No. 420,285, dated January 28, 1890.

Application filed June 6, 1889. Serial No. 313,411. (Model.)

*To all whom it may concern:*

Be it known that I, GEORG ST. MEYER, a resident of Felton, York county, Pennsylvania, have invented certain new and useful Improvements in Reversible Locks, of which the following is a specification.

My invention consists in a new and improved reversible lock, which will be hereinafter fully described and claimed.

Figure 1:
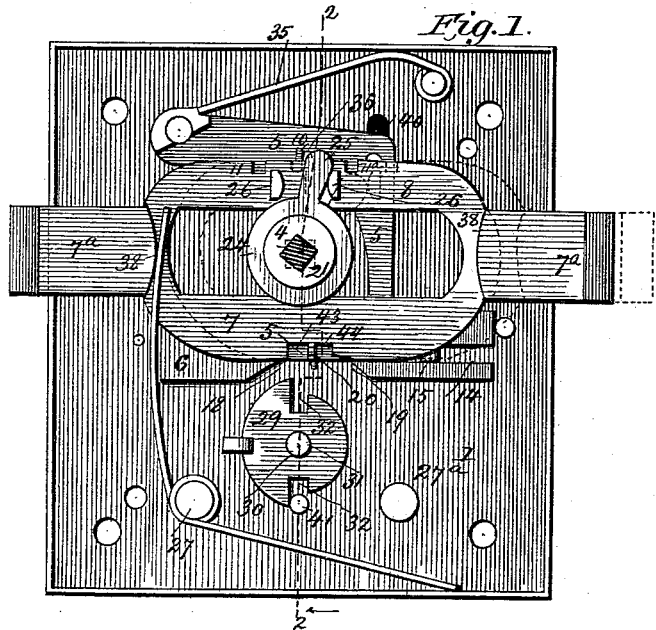
Figure 2:
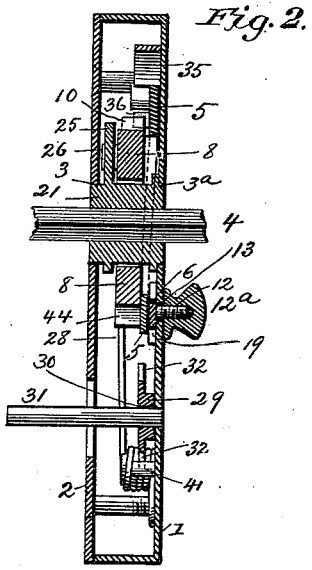
Figure 3:
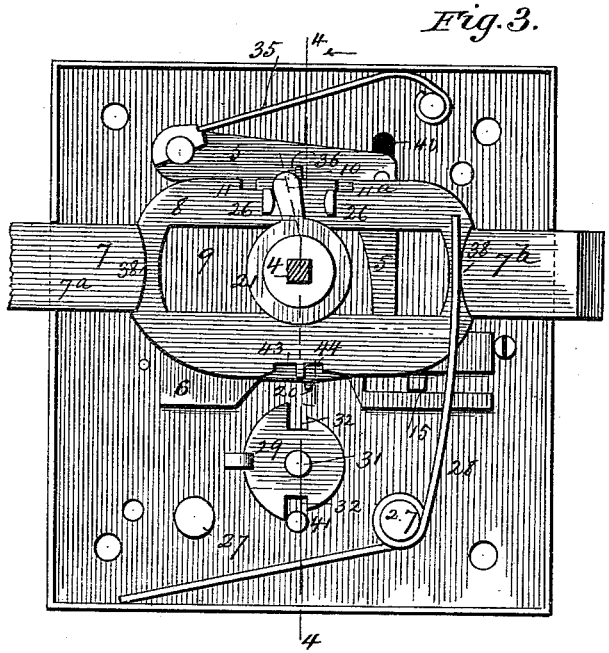
Figure 4:
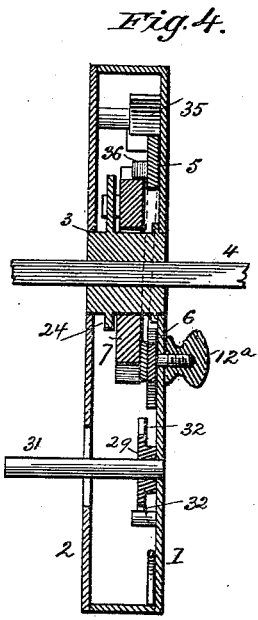
Figure 5:
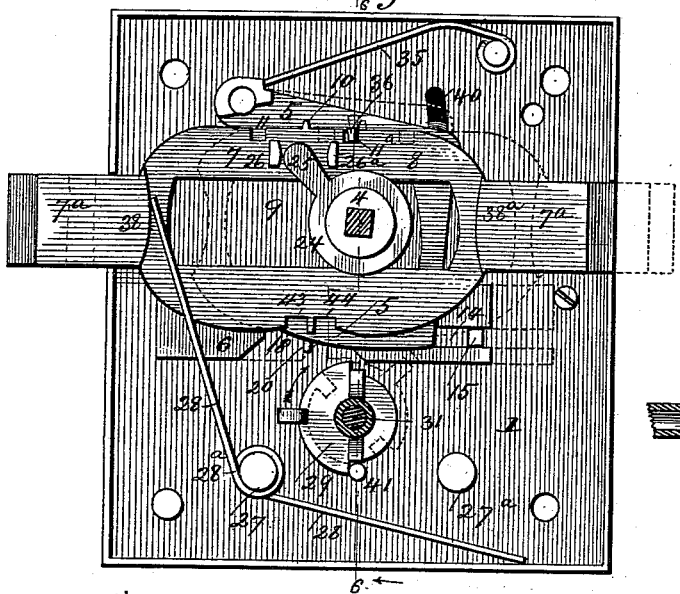
Figure 6:
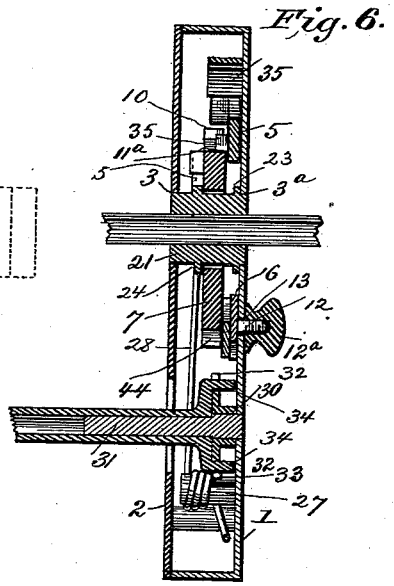
Figures 7, 8:
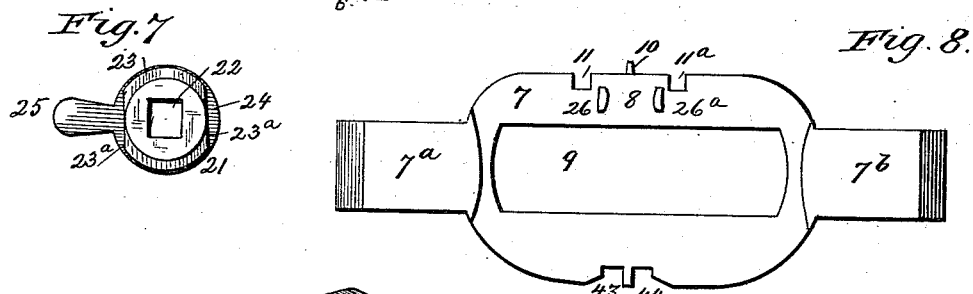
Figures 9, 10, 11:
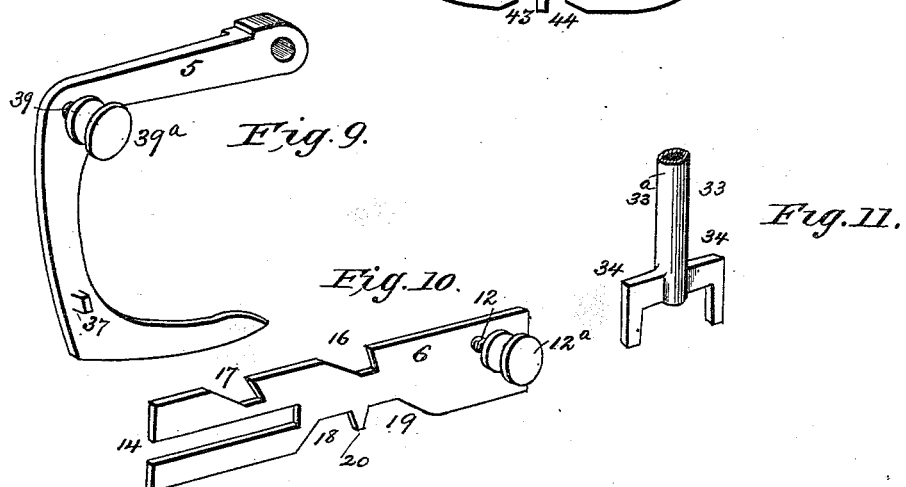

Referring to the accompanying drawings, Figure 1 is a side view with the side plate removed, showing the lock arranged as a right-hand lock. Fig. 2 is a vertical sectional view taken on the plane indicated by line 2 2 of Fig. 2, looking in the direction indicated by the arrow. Fig. 3 is a side view with the side plate removed, showing the lock arranged as a left-hand lock. Fig. 4 is a sectional view on the plane indicated by line 4 4, Fig. 3. Fig. 5 shows the lock arranged as a right-hand lock and locked. Fig. 6 is a sectional view on the plane indicated by line 6 6, Fig. 5. Figs. 7, 8, 9, 10, and 11 are detail views, which will be hereinafter referred to.

The same numerals of reference indicate corresponding parts in all the figures.

Referring to the several parts by their designating-numerals, 1 indicates the main part of the outer casing of the lock, the open side of which is closed by the plate 2. The casing is formed with the opening 3 3$^a$ in the two sides, through which the handle 4 passes. Above and to one side of the handle-opening 3 of the side 1 is pivoted to the inner side of part 1 the upper end of a reversing plate or lever 5. The upper horizontal part of this lever extends across above the opening 3 and down at one side thereof, its lower free end then extending across under the opening 3, the lower edge of this end being curved, as shown. The lower end of the lever 5 is only about one-half as thick as its upper end, and a flat locking-plate 6, which will be hereinafter described in detail, is located beneath the said lower end, extending horizontally beneath the handle-opening 3.

7 indicates the double-ended reversible bolt, the ends 7$^a$ 7$^b$ of which are precisely similar, while the central part or plate 8 of the bolt is flattened and widened out and formed with the central longitudinal slot 9.

The upper edge of the central part 8 is formed with a central vertical projection 10, and to each side of this projection a recess 11 11$^a$ is formed in the upper edge, while in the lower edge of the bolt-plate are two recesses 43 44.

The locking-plate 6 has screwed into it near one end a threaded pin 12, which passes through a horizontal slot 13 in the side 1 of the casing, and has a small knob 12$^a$ on its outer end. The other end of the locking-plate is formed with a longitudinal slot 14, into which fits a guide-pin 15. The upper edge of the locking-plate is formed with the two recesses 16 17, while its lower edge is formed with two recesses 18 19 and a central projection 20, separating said recesses.

The handle 4 passes through a block 21 within the casing, which may be called the "handle-block," this block having a square central opening 22, through which the handle, square in cross-section, passes, the ends of the round body of the block fitting and turning in the openings 3 3$^a$. The block 21 has near its ends the bearing-flanges 23 24, which hold it from slipping, the end flange 23 being cut away at opposite sides 23$^a$ to permit of the integral block being placed in position, the block passing through the longitudinal slot 9 of the bolt. The end flange 24 is formed with an extension 25, which fits up between two lugs 26 26$^a$ on that side of the upper half of plate 8, as shown. In the lower part of the casing, secured to the side 1, are two pivot-pins 27 27$^a$—one on each side of the center of the lock.

28 indicates the reversible bolt-spring, which is formed in the center with a coil 28$^a$ of such size as to fit over one of the pins 27 27$^a$.

29 indicates the cam for locking and unlocking the bolt, having a round central opening 30, through which a pivot-pin 31 passes, and having the opposite recesses 32 32, in which the ends 34 34 of the key 33 fit. This key is formed with the hollow stem 33$^a$ and the ends 34 34, as shown.

A spring 35, secured at one end in the casing, presses the pivoted lever 5 down, so that a lug or stop 36 on its side is held in close proximity to the upper edge of the bolt-plate 8 when the knob 12$^a$ of the plate 6 is moved to the center of the slot 13, bringing the solid upper edge of said plate between the recesses 16 and 17 under a side lug or stop 37 of the lever 5 near its lower end.

To use the lock as a right-hand lock, the center coil 28ª of the spring 28 is seated on the right-hand pin 27, with the lower end of the spring bearing against the bottom of the casing, while the upper end of the spring bears against a shoulder 38 at the inner end of the right-hand end of the bolt. The spring-actuated lever 5 is raised by raising the knob 39ª on the outer end of a threaded pin 39, which is screwed into the lever 5 at the point shown, the pin passing through a curved slot 40 in the side 1 and lowered with the stop 36 on the right-hand side of the central edge projection 10 of the bolt-plate 8. It will then be seen that the bolt will act as an ordinary door-latch. Turning the handle 4 to the left turns the block 21, which slides the bolt to the left to open the door, while on releasing the handle-knob the spring 28 forces the bolt out again to latch the door. The knob 12ª is left at the center of the slot 13, when the plate 6, through the lug 37, will prevent the upper stop 36 from entering the right-hand recess 11 of the bolt-plate 8.

To lock the door, the lever 5 is raised by raising its knob and pushing knob 12ª to the right-hand end of the slot 13, when the spring will shoot the bolt out to lock the door, carrying the bolt projection 10 to the right of the lever-stop 36, which enters the left-hand bolt-recess 11ª, thus locking the door, while the lower lug 37 enters the upper recess 17 of the locking-plate. The door can then be opened from the inside by raising the knob of the lever 5 and turning the handle, while to unlock it from the outside the key 33 is inserted in the key-hole, with its ends engaging the recessed cam 29, and the cam turned to the right. A stop 41 holds the cam in position by coming in contact with its extension 42, so that its recesses will be always in line with the key-hole when inserting the key. As the cam is turned it first comes in contact with the rounded lower edge of the lower end of lever 5, raising the lever until its stops are clear of the bolt-plate and locking-plate 6, when the point of the cam enters the registering lower recesses 18 and 43 of the locking-plate and bolt-plate 8, respectively, sliding them to the left until the stop 37 rests on the upper edge of the locking-plate between recesses 18 and 19, and the stop 36 of the lever 5 rests at the right of the top projection 10 of the bolt-plate. The door is then unlocked, and can be opened by turning the handle-knob, as will be readily seen.

To lock the door, the key is turned to the left, when the cam raises the lever 5 and slides the locking plate and bolt to the right into their former locked position. (Shown in Fig. 3.)

To prevent the door from being unlocked from the outside when locked, it is only necessary to push the knob 12ª to the left to that end of the slot 13. When the key is then placed in the key-hole and turned, the point of the cam 29 will come in contact with the solid lower edge of the locking-plate 6 to the left of the recesses 18 and 19, and will be thus stopped by the plate 6. It will thus be seen that it will be impossible to unlock the door from the outside as long as the plate 6 is pushed to the left, while as soon as the plate 6 is pushed back to the right the door can be at once unlocked, as before described.

To change my new and improved lock to a left-hand lock, the spring 28 is removed from the right-hand pin 27 and its coil seated on the left-hand pin 27ª, with the upper end of the spring bearing against the shoulder 38ª at the inner end of the left-hand bolt end. The lever 5 is then raised by its knob 39ª and lowered with the stop 36 on the left-hand side of the central projection 10 of the bolt-plate. The cam 29 is then turned around to the left on its pivot. The lock reversed to act as a left-hand lock is shown in Fig. 3. The action of the entire lock is now reversed by these small changes, as will be readily seen, and it can be used as an ordinary door-latch; or the door can be locked by raising lever 5 by its knob and pushing the knob 12ª of the locking-plate to the left end of slot 13, and unlocked and locked by the key, as will be readily understood without exhaustive description; also, to prevent the locked door being unlocked from the outside when desired, the knob 12ª has only to be pushed to the right-hand end of slot 13, moving the locking-plate 6 to the right to stop the turning of the cam 29, as shown in Fig. 5.

Having thus described my invention, what I claim, and desire to secure by Letters Patent, is—

1. In a reversible lock, the combination, with an outer casing having the pivot-pins 27 27ª, of the double-ended bolt having a central longitudinal slot and the side lugs 26 26ª, the block 21, having the central opening and the extension 25, and the reversible spring 28, substantially as set forth.

2. In a reversible lock, the combination, with an outer casing having the pivot-pins 27 27ª and curved slot 40, of the double-ended bolt having the central longitudinal slot, the shoulders 38 38ª, the top projection 10, and the side lugs 26 26ª, the pivoted spring-actuated lever 5, having the stop 36, and a pin having the knob at its outer end, the block 21, having the central opening and the extension 25, and the reversible spring 28, substantially as set forth.

3. In a reversible lock, the combination, with an outer casing having the pivot-pins 27, 27ª, and 31 and slots 40 and 13, of the double-ended bolt having the central longitudinal slot, the shoulders 38 38ª, the top recesses 11 and 11ª and central top projection 10, the side lugs 26 26ª, and bottom recesses 43 44, the curved pivoted spring-actuated lever 5, having the side projections 36 and 37 and the pin having the knob at its outer end, the locking-plate having the top and bottom recesses, and the pin having the knob at its outer end, the block 21, having the central opening and the extension 25, and the reversible spring 28, substantially as set forth.

4. In a reversible lock, the combination, with an outer casing having the pivot-pins 27, 27$^a$, and 31, the guide-pin 15, and slots 40 and 13, of the double-ended bolt having the central longitudinal slot, the shoulders 38 38$^a$, the top recesses 11 and 11$^a$ and central top projection 10, the side lugs 26 26$^a$, and bottom recesses 43 44, the curved pivoted spring-actuated lever 5, having the side projections 36 and 37, and the pin having the knob at its outer end, the locking-plate having the top and bottom recesses and end slot, and the pin having the knob at its outer end, the block 21, having the central opening and the extension 25, the reversible spring 28, and the recessed cam and the key for the same, substantially as set forth.

GEORG ST. MEYER.

Witnesses:
 LEANDER F. HESS,
 JOHN T. INNESS.